United States Patent

Penna et al.

Patent Number: 5,838,332
Date of Patent: Nov. 17, 1998

[54] GRAPHIC IMAGE RENDERING

[75] Inventors: David E. Penna, Redhill; Karl J. Wood, Crawley, both of England

[73] Assignee: U.S. Philips Corporation, New York, N.Y.

[21] Appl. No.: 705,547

[22] Filed: Aug. 29, 1996

[30] Foreign Application Priority Data

Sep. 13, 1995 [GB] United Kingdom ............. 9518695

[51] Int. Cl.$^6$ ........................................ G06T 11/40
[52] U.S. Cl. .................................................. 345/430
[58] Field of Search ........................ 345/421, 423, 345/425, 430

[56] References Cited

U.S. PATENT DOCUMENTS

| | | | |
|---|---|---|---|
| 4,815,009 | 3/1989 | Blatin | 345/429 |
| 4,901,251 | 2/1990 | Sfarti | 345/429 |
| 5,014,223 | 5/1991 | Tanimori | 338/99 |
| 5,651,106 | 7/1997 | Ashburn | 395/141 |
| 5,657,436 | 8/1997 | Ashburn | 395/141 |

FOREIGN PATENT DOCUMENTS

| | | |
|---|---|---|
| 0656609A1 | 6/1995 | European Pat. Off. . |
| 2226481 | 6/1990 | United Kingdom . |

*Primary Examiner*—Joseph H. Feild
*Assistant Examiner*—Motilewa Good-Johnson
*Attorney, Agent, or Firm*—Robert M. McDermott

[57] ABSTRACT

An image processing method and apparatus are described for polygon rendering in two dimensional screen space, where the rendering includes mapping of texels from a texture map onto pixels within the polygon. The texture map (18) holds fewer texels than would be required to render a full screen of pixels, or even a large polygon, and the rendering process is carried out in a sequence of rendering windows overlying successive areas of a polygon, with the texture memory (18) being refreshed from mass storage (12) as required between windows. Storage (20) is provided for calculated polygon edge data to enable continuous edges to be maintained over two or more rendering windows to avoid discontinuity effects.

8 Claims, 3 Drawing Sheets

GRAPHIC IMAGE RENDERING

The present invention relates to a method and apparatus for image processing and particularly, but not exclusively, the present invention relates to rendering a two dimensional image from three dimensional image data, where polygons defined in three dimensional space are projected into two dimensional space and pixel values from a two dimensional image or texture map are mapped onto pixel positions within the projected two dimensional polygon.

Computer graphics systems are known in which two dimensional video images or two dimensional textures are arranged such as to appear wrapped around a solid three dimensional object. The techniques by which this is achieved are generally known as texture mapping, variations of which are described in "Computer Graphics: Principles and Practice" by Foley, van Dam, Feiner and Hughes, pub. Addison Wesley 1990, ISBN 0-201-12110-7 at pp. 741–744.

A three dimensional object onto which a two dimensional image or texture is to be mapped is represented as three dimensional image data, in which the vertices of polyhedra are defined as three dimensional co-ordinate locations within a virtual three dimensional world, commonly referred to as world-space. The object is viewed by producing a two dimensional projection from the three dimensional data, so as to produce a still two-dimensional image, or a sequence of images, which may be recorded onto photographic film or a video carrying medium.

The position of objects, along with viewing position and orientation, may be adjusted within the three dimensional world-space, resulting in a sequence of projections being calculated. These projections may be calculated on a frame-by-frame basis, possibly in real time, thereby facilitating the creation of a virtual interactive environment.

In order to effect the rendering of three dimensional objects, each surface of a polyhedron may be considered individually, thereby reducing the object to a net of polygons. Thus, it is possible to project the object on a polygon-by-polygon basis and to calculate lighting values for each polygon, so that displayable pixel values may be determined for the pixel positions which lie within the projected polygon boundaries.

In order to create the illusion of a three dimensional object being viewed, it is necessary to take account of perspective, when projecting the three dimensional polygons onto the two dimensional plane. This is a non-linear process and, consequently, computationally demanding. It is therefore preferable to project the vertices of the three dimensional polygons onto positions within the two dimensional plane and thereafter perform further operations, such as shading and rendering, on the two dimensional polygons, such that it is only necessary to perform calculations with respect to two dimensions, rather than three.

A problem which can occur in practical texture mapping systems is the memory bandwidth that can be required. If the simplest technique (point sampling) for sampling the texture image is used then one texture map value (texel) will be needed per displayed pixel. If techniques such as bilinear or trilinear interpolation are used then four or eight texels may need to be read for each displayed pixel.

One known way to reduce this memory bandwidth is to have a dedicated memory area to hold texture maps. This can be a multiport memory so that, for example four or eight accesses can occur simultaneously to give high speed bi- or trilinearly interpolated texture map access. This memory may be a small memory integrated into a three-dimensional rendering chip where silicon area is at a premium, leading to the problem of the texture map memory not being big enough to contain all the texture map data required to render a scene or even a large polygon.

An example of a system which recognises these problems is described in United Kingdom patent application GB-A-2 226 481 (Malachowsky/Sun Microsystems Inc). Their solution involves treating all polygons as quadrilaterals and using a simple look-up table to identify which pair of edges define the horizontal boundaries to successive areas of the polygon, each of which is rendered as a sequence of horizontal scan lines. Whilst this system does remove the need for multiple screen buffers, problems of discontinuity can occur where a polygon edge crosses more than one rendering area.

It is therefore an object of the present invention to provide a system capable of rendering images composed of one or more polygons, using a texture memory of relatively limited capacity, whilst reducing or removing discontinuity effects due to split polygon edges.

According to a first aspect of the present invention, there is provided an image processing method for rendering a two dimensional image wherein a polygon is defined in two dimensional screen space and pixel texture values (texels) from a two dimensional texture map are mapped onto pixels within said two dimensional polygon, the method comprising, for the or each polygon the steps of:

a) defining a texture rendering window covering a number of said pixels requiring, in total, less than or equal to the number of texels in said texture map for rendering;

b) determining the vertical height of the uppermost vertex of said polygon within said two dimensional screen space and positioning said rendering window such that it overlies at least a part of said polygon and the uppermost extent of said window is at or above said vertical height of said uppermost vertex of said polygon;

c) rendering that part of said polygon lying within said rendering window by mapping texels from said texture map; and d) moving said rendering window to a further position within said two dimensional screen space overlying at least a part of said polygon and abutting a previous rendering window position;

wherein steps c) and d) are sequentially repeated until all of said polygon has been rendered; wherein said texture map holds fewer texels than are required to render a full screen and said first rendering window overlies a vertex of said polygon and slope values for the polygon edges to said vertex are calculated and stored, an intercept point on the or each said edge is identified to sub-pixel accuracy and stored, and for each further rendering operation where a rendering window overlies a part of one or other of the said polygon edges, the previously calculated slope values and intercept point locations are recalled from storage. In this way, by sequentially rendering "patches" of polygon, the problem of small texture memory space is avoided and polygons larger than conventionally covered in texture memory may be rendered, and by providing storage of slope values, the potential discontinuities due to recalculating them for each rendering window are avoided. By storing intercept points, suitable where an edge crosses a window boundary identified to sub-pixel accuracy, discontinuities due to pixel rounding between windows are avoided.

The texture map contents may be updated following step c) or, preferably, after step d) with the updated texture map contents being determined by the new position of the rendering window in screen space. With this latter arrangement, the sequence of rendering window positions may be determined by the rendering apparatus without being dictated by the texture map contents. Notwithstanding this, however, where two or more rendering windows are required at the same vertical location within screen space, they may suitably be rendered in order from left to right of the screen space.

In an extension to the technique, the polygon may be divided into smaller polygons, with each smaller polygon being of a size capable of rendering with a single rendering window (although with slope values being maintained as described above). Suitably, such a sub-division is made such that each of the smaller polygons has an edge aligned with one of the horizontal and vertical screen space axes.

Also in accordance with the present invention there is provided an image processing apparatus arranged to render an image including one or more polygons defined in two dimensional screen space, said apparatus comprising:

first storage means holding a pixel texture map containing a plurality of pixel texture values (texels);

second storage means arranged to store the coordinates of the vertices of a polygon in two dimensional screen space;

image rendering means operable to map texels from said texture map onto pixels within said polygon; and rendering window generation means coupled to said first and said second storage means and arranged to generate a sequence of abutting windows within said two dimensional screen space, each of said windows overlying at least a part of said polygon and covering a number of pixels less than or equal to the number of pixels capable of being rendered by the total number of texels held within said texture map, with said image rendering means being controlled by said window generation means to render those pixels of said polygon within a currently generated rendering window, wherein said texture map holds fewer texels than required to render a full screen of pixels and said apparatus further comprises slope calculation means coupled with said image rendering means and arranged to calculate slope values for the edges of said polygon when said rendering window overlies a vertex of said polygon, and third storage means arranged to receive and store calculated slope values, with said image rendering means being configured to determine for any polygon edge within the rendering window whether a slope value for that edge is stored and, if so, to use the stored slope value in rendering. This third storage means may suitably also hold edge intercept points as described above.

Where the polygon is part of an image derived from three dimensions, the apparatus may be operable to successively map a plurality of such polygons (each having an associated depth value) and include means for determining which of the plurality of polygons has the greatest depth value and mapping that polygon first.

The invention will now be described by way of example only, with reference to the accompanying drawings, in which.

Figure 1:
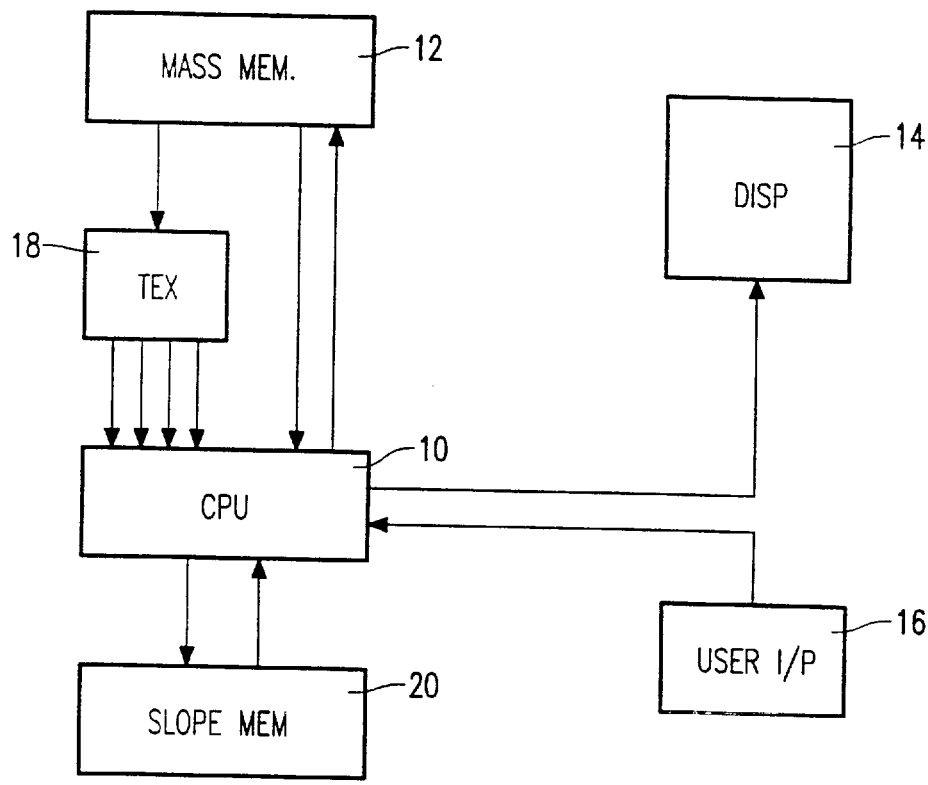
FIG. 1 is a block schematic diagram of an image processing system embodying the present invention.

An image processing and rendering apparatus is shown in FIG. 1, having a processing unit 10, arranged to process three dimensional image data to produce a viewable two dimensional view of a virtual three dimensional world. Three dimensional data and instructions controlling the operation of the processor 10, are held in a mass storage device 12, which may include a magnetic disc, an optical disc, a magneto-optical disc or other suitable storage medium capable of supplying data to the processor 10 at the required rate. Further storage is provided for pixel texture values (texels) in memory 18, and for derived slope and screen space coordinates in memory 20, as will be described.

Video images generated by the processor are supplied to a video monitor 14, which could be in the form of a conventional television receiver. Furthermore, interactive user inputs are received from a controller 16, which could take the form of a keyboard, tracker-ball, mouse or dedicated key-pad, etc.

Figure 2:
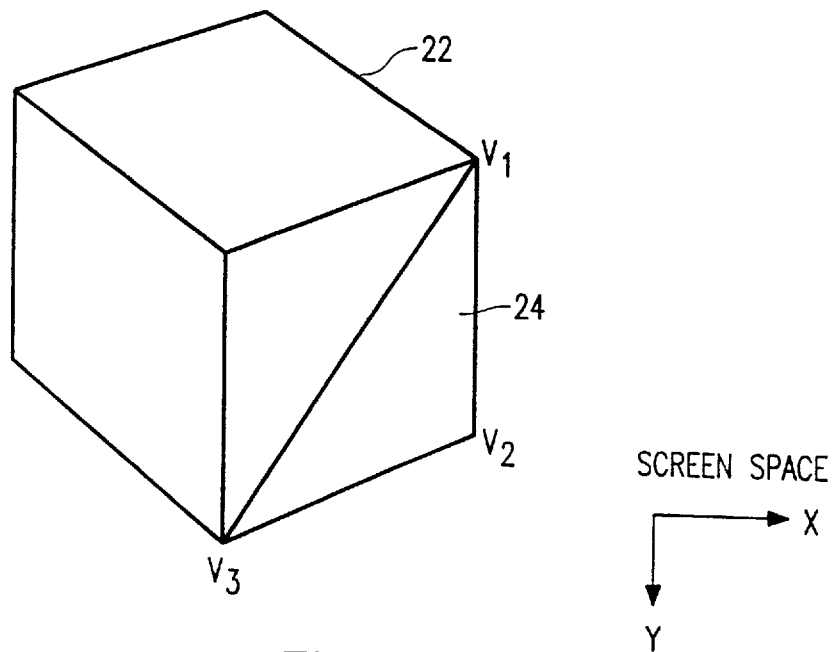
FIG. 2 represents a three-dimensional virtual body to be mapped into screen space.
Figure 3:
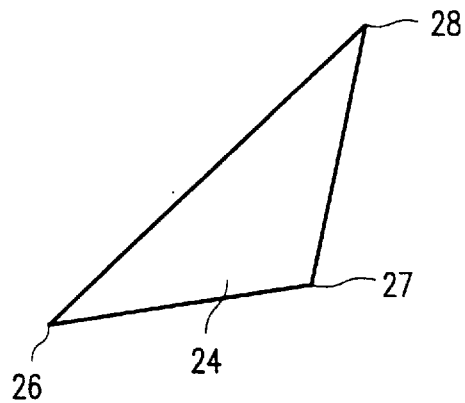
FIG. 3 represents a polygon forming a part of the surface of the body of FIG. 3 mapped in screen space.

Three dimensional data is stored in the form of definitions of the position of polyhedra vertices in a three dimensional co-ordinate space. A two dimensional view of the three dimensional data is produced, on a frame-by-frame basis, by considering the vertices as being connected by straight lines, thereby defining a net of flat polygons. A view is rendered by considering each polygon in turn, possibly after performing back face culling, etc., so as to remove polygons which are not visible from the particular view under consideration. Thereafter, a list of polygons may be defined, which ensures that the polygons are rendered in the correct order. FIGS. 2 and 3 illustrate how a three dimensional object, in this case a cube 22, may be viewed as a net of flat polygons, with FIG. 3 showing a polygon 24 (in this case a triangle forming part of one face of the cube 22) which has been projected into a two dimensional viewing plane by processing three dimensional co-ordinates for the vertices 26, 27 and 28. Thus, these vertices were previously defined in a three dimensional space, having x, y and z co-ordinates and are projected onto a two dimensional (X,Y) plane.

The conveyance of information obtained from the z dimension to an observer may be achieved by ensuring that the polygons are rendered in the correct order, that is to say, polygons towards the rear (having greatest z extent) are rendered before polygons which have lower values of z, thereby ensuring that the polygons closest to an observer occlude polygons which are further away from the observer. Furthermore, information derived from the z dimension may also be retained to enable perspectively correct projection of the polygons onto the two dimensional plane. A technique for the maintenance of correct perspective is described in our co-pending European patent application EP-A-0,656,609.

After projection, vertices 26, 27 and 28 are positioned at perspectively correct locations within the two dimensional display image-frame. Each vertex contains coordinate locations reflecting a mapping from the three dimensional world space to the two dimensional display image plane, in the form of a three dimensional co-ordinate set and a two dimensional co-ordinate set. In addition, each vertex may also contain other information, such as that defining aspects of the surface of the polygon, such as its colour, opacity or specularity, etc.

Figure 4:
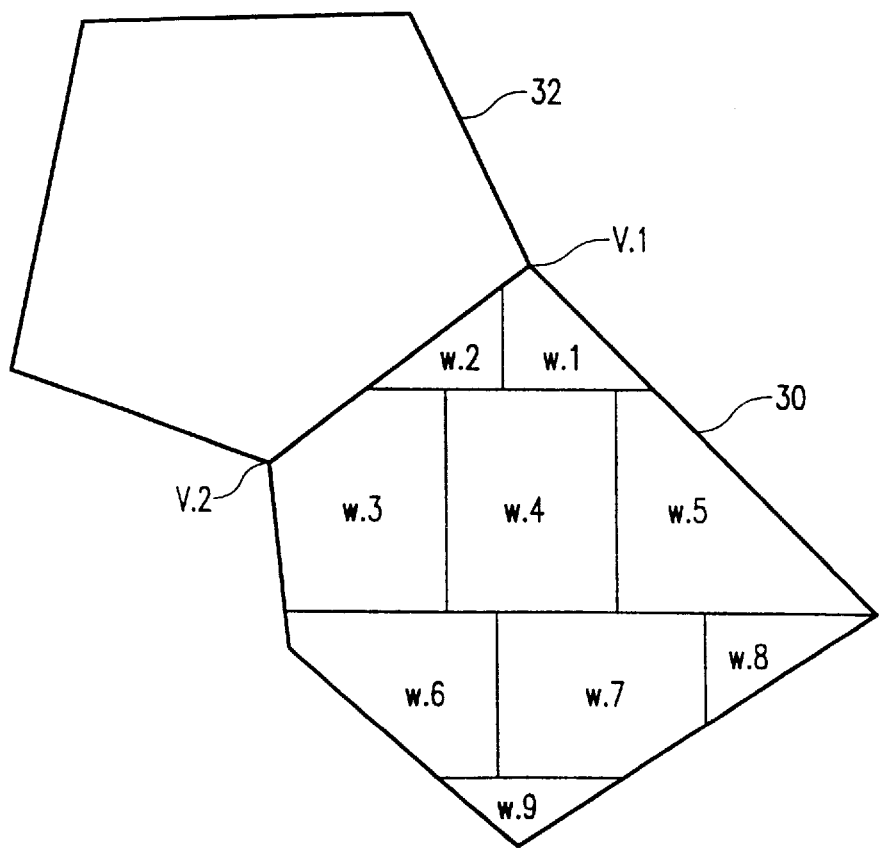
FIG. 4 shows a pair of polygons, one of which is divided into a number of rendering windows.

To cope with the case where the texture map required for an individual polygon (or other rendered geometric primitive) is bigger than will fit into the texture memory, the polygon 30 may be treated as a series of texture rendering windows w.1 to w.9 as shown in FIG. 4, with each of the windows covering a number of pixels requiring, in total, less than or equal to the number of texels in the texture map for rendering. Each window is rendered in turn and, after each rendering, the rendering window is moved to a further position within the screen space overlying at least a part of the polygon and abutting a previous rendering window position (e.g. from w.1 to w.2, or from w.2 to w.3). Whilst this subdivision on the basis of texture memory capacity solves the problem of 'large' polygons, a further problem can arise due to the fact that some of the edges of the polygon will have been divided while the edges of adjacent polygons may not have been. This situation can be seen for the edge V.1–V.2 in FIG. 4: in terms of polygon 30, this edge has been divided but in terms of abutting polygon 32, it has not.

In many types of rendering system this is undesirable because it can lead to effects such as single pixel gaps between the polygons. In order to ensure that the edges of the two polygons precisely match, so that all pixels are displayed without gaps or overlaps, the arithmetic for computation of the two edges should match precisely. Where the edges share a common pair of vertices (as between V.1 and V.2 in FIG. 4), this is relatively easy to accomplish. Problems may arise however where there is a 'T-junction', that is to say a partially shared edge where the vertex of one polygon lies between vertices of another. In order to avoid such discontinuity problems, we render a 'large' polygon in several windows, but preserve the edge continuity to avoid artifacts such as single pixel holes.

Figure 5:
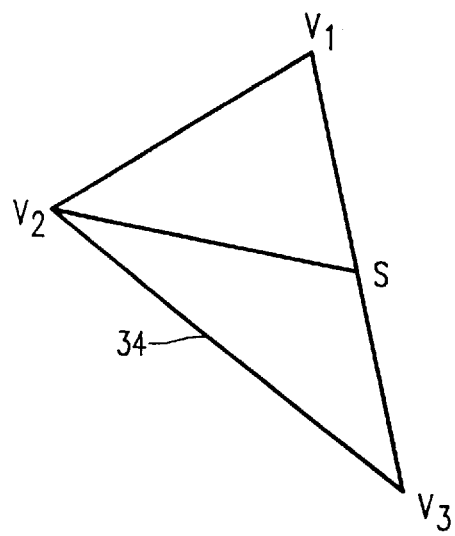
FIG. 5 illustrates a known technique for subdividing polygons prior to rendering.

To illustrate the technique, we shall briefly consider the triangular polygon 34 shown in FIG. 5, having vertices V.1, V.2 and V.3, which covers a texture area too big for the texture map memory. Following conventional methods, an additional vertex S would be specified between V.1 and V.3. Whilst this subdivision would allow the texture map for the two halves individually to fit in the texture memory, it requires the two separate sub-polygons to be processed separately. This will lead to the T-junction problem in many systems, particularly where edge V.1–V.3 is continuous for another polygon. The slope calculations for both halves of the edge (V.1 to S, and S to V.2) are likely to be changed by the fact that the calculation routes are different and in particular by the rounding errors that may occur in a practical system.

Figure 6:
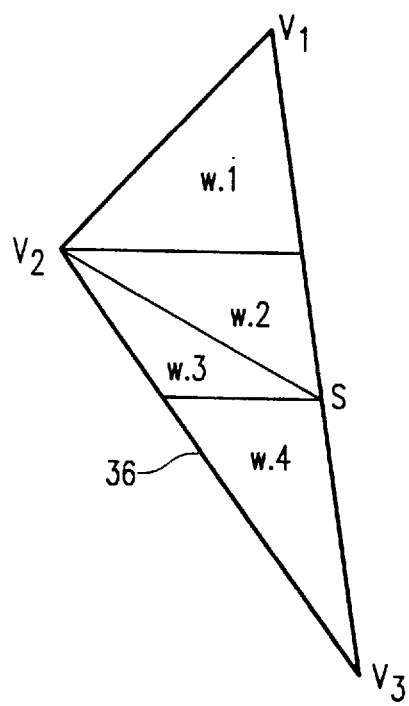
FIGS. 6 and 7 illustrate techniques for polygon rendering embodying the present invention.

In order to avoid this problem, we preserve the continuity of the edges by precisely maintaining the edge arithmetic as if the polygon had been rendered as a whole, as will now be described with reference to the polygon 36 shown in FIG. 6. The processing up to the point of rendering the polygon is unaffected by the need to split it and no new vertices are thus introduced.

The rendering process starts with the calculation of slope values for the edges V.1–V.3 and V.1–V.2, which slope values will be stored by the system (memory 20; FIG. 1). The process runs (from top to bottom in the system here described, although the technique could equally work bottom to top) from V.1 until the display line containing vertex V.2. This polygon segment (comprising the first rendering window w.1) has now been drawn.

At this point a new edge is computed running from V.2 to an intersection point S (the location of which is stored) on edge V.1–V.3 and the rendering process resumes. It is important to note that the rendering parameters for the right hand edge of this second rendering window w.2 are continued from w.1 and thus have not been subject to changes arising from inaccuracies in recalculation.

At the completion of window w.2, when the display line containing S is reached, a new set of left edge parameters are required, with the slope being calculated for edge V.2–V.3, and this value also is stored. Additionally, a new set of right edge parameters are generated for the edge from V.2 to S and window w.3 is rendered.

Finally, window w.4 is rendered to complete the original polygon. For this window, the left edge parameters are left unchanged to preserve continuity of the edge V.2–V.3, while the parameters of the V.1 to V.3 edge that were saved before w.3 was rendered are now restored from storage to preserve the continuity of that edge.

The polygon has now been rendered without disturbing the edge continuity. Between the rendering of the various windows the contents of the texture memory (memory 18; FIG. 1) will have been changed as necessary so that a map will be present which will cover the region about to be rendered.

Figure 7:
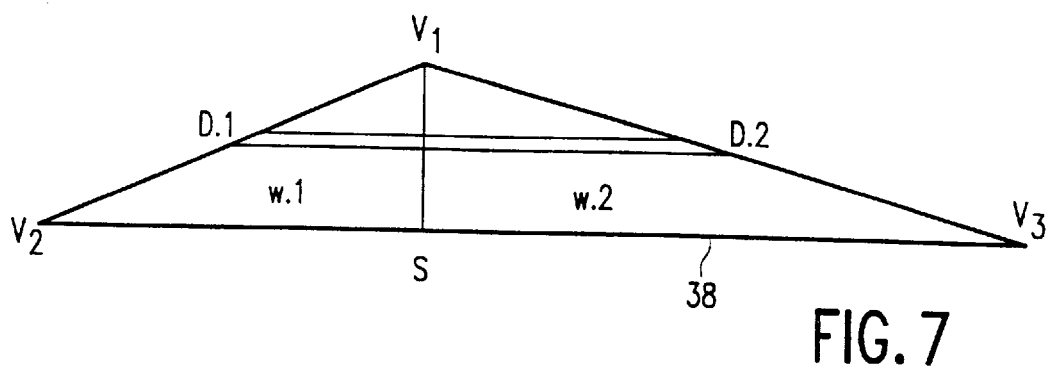

In order to avoid discontinuity of pixel lines where they cross more than one window (as between w.2 and w.3 in FIG. 6), the pixel data is maintained for the join between windows. Considering pixel row D.1 to D.2 through the polygon 38 of FIG. 7, if the polygon had not been split into separate windows w.1 and w.2 by dividing line V.1–S, then all the pixels in row D.1 to D.2 would be rendered in sequence.

For window w.1, the process is as before except that the rendering process for the pixel row will stop when it reaches the line from V.1 to S. While rendering w.2, the rendering of the remainder of the pixel row must start with the pixel following the last pixel rendered previously and must have the same values for all the horizontally interpolated quantities as would have been present had the pixel row been rendered in one piece. The pixel position is obtained by an identical processing of the V.1 to S edge, with the continuation values of the horizontal interpolation quantities being obtained by taking the starting values derived from the V.1 to V.2 left edge and adding the horizontal slope value multiplied by the horizontal distance from the left edge to the V.1 to S edge.

Whilst the above requires that three edges be tracked while drawing the right hand half of the polygon, this requirement can be eased if the subdivisions are always made to occur along horizontal and vertical edges.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An image processing method for rendering a two dimensional image wherein a polygon is defined in two dimensional screen space and pixel texture values (texels) from a two dimensional texture map are mapped onto pixels within said two dimensional polygon, the method comprising, for the or each polygon the steps of:

a) defining a texture rendering window covering a number of said pixels requiring, in total, less than or equal to the number of texels in said texture map for rendering;

b) determining the vertical height of the uppermost vertex of said polygon within said two dimensional screen space and positioning said rendering window such that it overlies at least a part of said polygon and the uppermost extent of said window is at or above said vertical height of said uppermost vertex of said polygon;

c) rendering that part of said polygon lying within said rendering window by mapping texels from said texture map; and d) moving said rendering window to a further position within said two dimensional screen space overlying at least a part of said polygon and abutting a previous rendering window position;

wherein steps c) and d) are sequentially repeated until all of said polygon has been rendered; wherein said texture map holds fewer texels than are required to render a full screen and said first rendering window overlies a vertex of said polygon and slope values for the polygon edges to said vertex are calculated and stored, an intercept point on the or each said edge is identified to sub-pixel accuracy and stored, and for each further rendering operation where a rendering window overlies a part of one or other of the said polygon edges, the previously calculated slope values and intercept point locations are recalled from storage.

2. A method as claimed in claim 1, comprising the further step of updating the contents of said texture map following step c).

3. A method as claimed in claim 2, where said step of updating said contents of said texture map occurs after step d) with the updated texture map contents being determined by the new position of the rendering window in screen space.

4. A method as claimed in claim 1, wherein, where two or more rendering windows are required at the same vertical location within screen space, said windows are rendered in order from left to right of the screen space.

5. A method as claimed in claim 1, further comprising the step of sub-dividing said polygon into smaller polygons, each of said smaller polygons being of a size capable of rendering with a single rendering window.

6. A method as claimed in claim 5, wherein the sub-division of said polygon is made such that each of said smaller polygons has an edge aligned with one of the horizontal and vertical screen space axes.

7. Image processing apparatus arranged to render an image including one or more polygons defined in two dimensional screen space, said apparatus comprising:

first storage means holding a pixel texture map containing a plurality of pixel texture values (texels);

second storage means arranged to store the coordinates of the vertices of a polygon in two dimensional screen space;

image rendering means operable to map texels from said texture map onto pixels within said polygon; and rendering window generation means coupled to said first and said second storage means and arranged to generate a sequence of abutting windows within said two dimensional screen space, each of said windows overlying at least a part of said polygon and covering a number of pixels less than or equal to the number of pixels capable of being rendered by the total number of texels held within said texture map, with said image rendering means being controlled by said window generation means to render those pixels of said polygon within a currently generated rendering window, wherein said texture map holds fewer texels than required to render a full screen of pixels and said apparatus further comprises slope calculation means coupled with said image rendering means and arranged to calculate slope values for the edges of said polygon when said rendering window overlies a vertex of said polygon, and third storage means arranged to receive and store calculated slope values, with said image rendering means being configured to determine for any polygon edge within the rendering window whether a slope value for that edge is stored and, if so, to use the stored slope value in rendering.

8. Apparatus according to claim 7, operable to successively map a plurality of polygons each having an associated depth value, including means for determining which of said plurality of polygons has the greatest depth value and mapping that polygon first.

* * * * *